United States Patent [19]
Simons

[11] 3,823,932
[45] July 16, 1974

[54] VEHICLE SEAT SUSPENSION WITH VARIABLE SPRING RATE
[75] Inventor: Allison K. Simons, Northampton, England
[73] Assignee: Universal Oil Products Company, Des Plaines, Ill.
[22] Filed: Nov. 24, 1972
[21] Appl. No.: 309,571

[30] Foreign Application Priority Data
Nov. 27, 1971 Great Britain.................... 55164/71

[52] U.S. Cl.................. 267/133, 267/154, 248/374, 248/399
[51] Int. Cl............................................. F16f 5/00
[58] Field of Search.................. 267/133, 154, 57.1; 248/399, 406, 374

[56] References Cited
UNITED STATES PATENTS
| | | | |
|---|---|---|---|
| 3,109,621 | 11/1963 | Simons et al. | 248/399 |
| 3,436,069 | 4/1969 | Henschen | 267/154 |
| 3,504,881 | 4/1970 | Pillons et al. | 248/374 |

Primary Examiner—James B. Marbert
Attorney, Agent, or Firm—James R. Hoatson, Jr.; Barry L. Clark; William H. Page, II

[57] ABSTRACT

Seat suspension system for tractors, trucks and other vehicles includes a pair of rubber torsion springs and a mechanism for selectively connecting or disconnecting one of the springs from operation with the other. In one embodiment the springs are selectively connectable in parallel to increase the total spring rate and in a second embodiment the springs are selectively connectable in series to decrease the spring rate. In both embodiments, one of the springs can be adjustably preloaded to adjust the seat's "ride" position for a particular operator. The variable spring rate feature permits either light or heavy operators to experience a good ride. It also permits the suspension to be tailored to the terrain so as to provide a stiff suspension for bumpy terrain and a light suspension for smooth terrain. Either embodiment can be set to automatically become stiffer when seat movement reaches a predetermined level.

9 Claims, 5 Drawing Figures

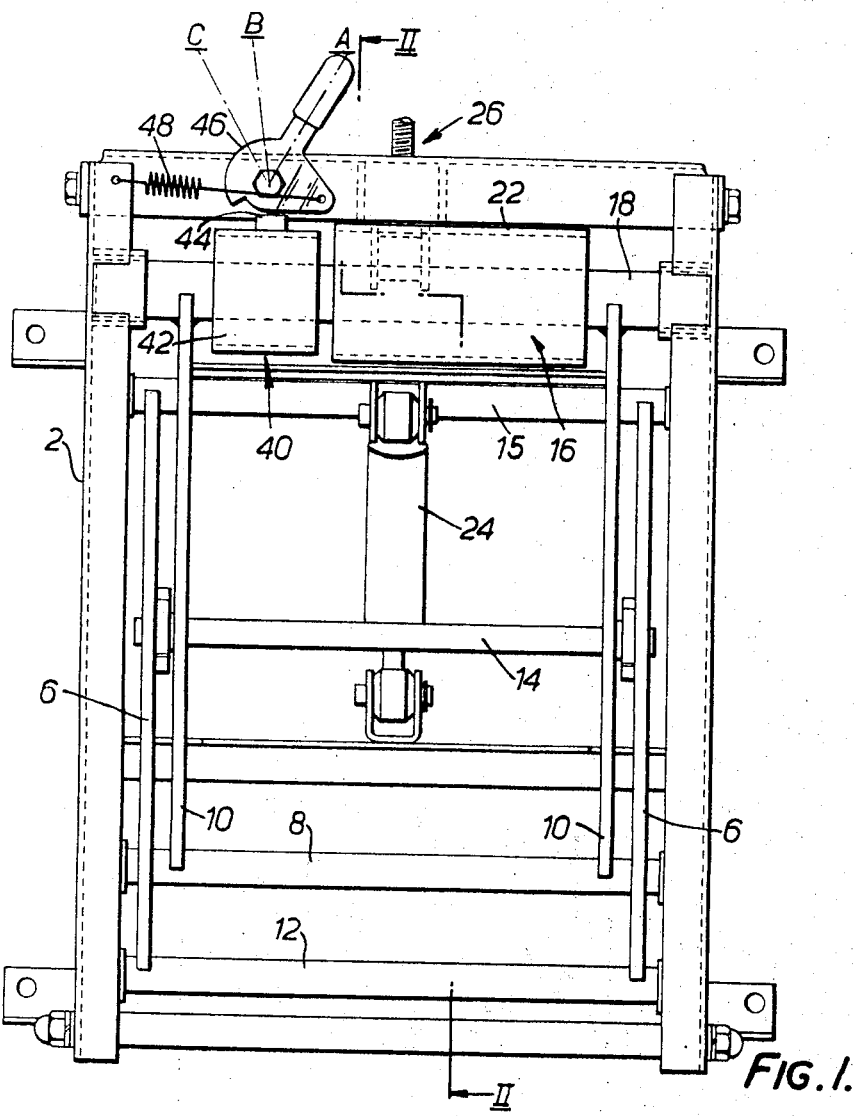
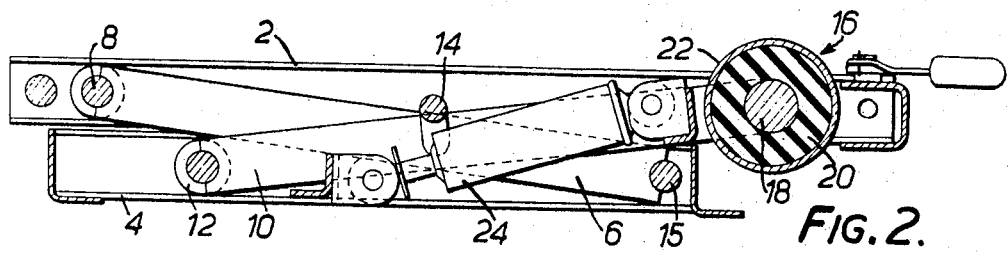

VEHICLE SEAT SUSPENSION WITH VARIABLE SPRING RATE

BACKGROUND OF THE INVENTION

This invention relates to suspension systems for vehicle seats for use in tractors, trucks and other vehicles where a large degree of vertical seat movement is necessary to isolate the operator from vertical vibratory movements of the vehicle. Torsion springs, including rubber torsion springs, are widely used in combination with shock absorbers in seat suspensions. Although it is common to adjust the fixed end of a torsion spring to preload the spring so that a particular seat occupant's weight will center the seat in its "ride" zone or range of vertical movement, such an adjustment does not change the spring rate of the spring. Torsion springs are commonly designed for an average to heavy weight occupant with the result that a lightweight occupant will not experience as good a ride as a heavier occupant. Furthermore, when a vehicle is being driven over rough terrain it is desirable that the suspension be much stiffer than required for travel over a smooth highway.

SUMMARY

The improved seat suspension of the invention solves certain problems of the prior art in that it permits the suspension to be tailored to meet the requirements of two weights of seat occupants rather than one by adjusting the spring rate of a dual torsion spring mechanism to two different values. The invention also includes a mechanism by which the occupant can cause the effective spring rate of the torsion springs to increase automatically when the seat bounces to a predetermined amplitude.

The improved suspension is preferably used on a seat assembly having a base and seat frames movable relative to each other by a scissors linkage. The primary torsion spring includes an internal rod member which is welded to one of the scissor link elements and an external cylinder member which is fixedly, but adjustably, attached to the seat frame. An annular sleeve of rubber bonded to the rod member and to the cylinder acts as a spring which resists movement of the aforementioned scissors link element. Coaxial with the primary torsion spring is a secondary torsion spring which also includes an annular sleeve of rubber bonded to the rod member and to a second external cylinder member. The second cylinder member is normally unrestrained so that it rotates freely with the rod member and rubber sleeve and thus offers no resistance to movement of the suspension. When it is desired to increase the stiffness of the suspension, a lever on the seat base can be actuated to cause a stop member to move into the path of the second cylinder and engage an abutment thereon. The engagement causes the second cylinder to be locked to the base and causes the two rubber sleeves to move in parallel. The net result is that the overall spring rate of the suspension increases since a greater volume of rubber is being moved.

In a modification, a first torsion element includes a rubber sleeve positioned between and bonded to an outer cylinder and an inner cylinder. The outer cylinder is adjustably fixed to the seat base while the inner cylinder is free to move on a rod member welded to the movable seat linkage. A second torsion element includes a rubber sleeve bonded to the rod member and to an outer cylinder. The outer cylinder is not connected to the base, but rather, is selectively connected to the inner cylinder of the first torsion element. When the first and second torsion elements are connected, they are connected in series rather than in parallel as in the first embodiment. Thus, the overall spring rate is lower when they are connected rather than higher. The spring rate can be increased by actuation of a biased rod on the base to lock the outer cylinder of the second torsion member and the inner cylinder of the first torsion member to the base.

Rather than use an annular rubber sleeve which is deformed in shear, it is possible to place four lengths of round rubber rods between the four flat sides of a square rod and the four corners of a surrounding square tube. The rubber will be compressed as the tube moves relative to the square rod.

BRIEF DESCRIPTION OF THE DRAWINGS

FIG. 1 is a plan of a seat suspension in accordance with the present invention;

FIG. 2 is a section taken on line II—II of FIG. 1;

As shown in FIGS. 1 to 3, the suspension comprises a frame 2, arranged to support a seat (not shown) mounted for upward and downward movement relative to a base frame 4 by means of a cross-arm linkage at each side of the base frame. Each linkage comprises a lever arm 6 extending forwardly and upwardly from a fixed pivot at the rear end portion of the base frame 4 to a horizontally sliding pivotal connection 8 at the forward end portion of the supporting frame 2, and a lever arm 10 extending rearwardly and upwardly from a horizontally sliding pivotal connection 12 at the forward end portion of the base frame 4 to a fixed pivot at the rear end portion of the supporting frame 2. The lever arms 6, 10 of each linkage are pivotally connected at their intersection by a pivot bar 14 extending between the two linkages and the fixed pivot for the lever arms 6 is formed by a shaft 15, journalled in the sides of the base frame 4.

Figure 3:
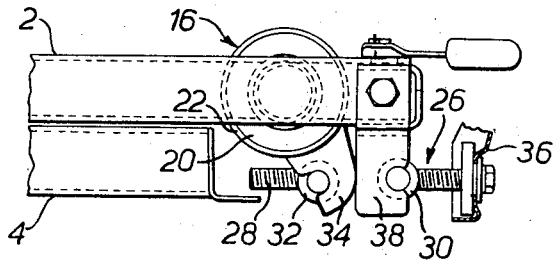
FIG. 3 is a fragmentary side elevation of the suspension shown in FIG. 1.

The supporting frame 2 is biased upwardly relative to the base frame 4 by a main spring assembly 16 extending across the rear end portion of the supporting frame 2. The spring assembly 16 comprises a shaft 18 journalled in the sides of the supporting frame 2 and being rigidly connected to the rear ends of the rearwardly extending lever arms 10 of each of the linkages so as to form the fixed pivot for these arms. Intermediate the lever arms, a sleeve 20 of rubber or other elastic material is mounted on the shaft 18, and the outer surface of the sleeve 20 is bonded to the inner surface of a cylindrical housing 22. The cylindrical housing 22 is locked against rotation relative to the supporting frame 2 so that when the supporting frame 2 is moved downwardly, the shaft 18 pivots relative to the housing 22 and stresses the sleeve 20 in shear whereby the sleeve 20 exerts a restoring force acting to return the supporting frame 2 upwardly. A shock absorber 24 is connected between the base frame 4, and the supporting frame 2.

The housing 22 is locked against rotation relative to the supporting frame 2 by a device 26 for varying the bias or pre-load exerted by the spring assembly. The bias-varying device 26 comprises a screw 28 journalled in a thrust bearing 30 in the supporting frame 2 and extending transversely to the housing 22. A cylindrical nut 32 engaged with the screw, is carried at its end portions by a radial lever arm formed by spaced lugs 34 extending radially from the housing 22 and rigid with the housing 22. The outer end portion of the screw 28 carries a handle 36 by which the screw 28 can be rotated to move the nut 32 axially. Such axial movement of the nut 32 causes pivotal movement of the housing 22 about the axis of the shaft 18 so that the shear stress in the sleeve 20, and thus the bias exerted by the sleeve 20, will be varied. In this manner, the "ride" position of a seat supported by the supporting frame 2 can be adjusted to suit the seat occupant. The thrust bearing 30 shown takes the form of a second cylindrical nut of opposite hand engaged with a threaded portion of opposite hand on the screw 28 and carried between lugs 38 depending from a rear cross-member of the supporting frame 2.

The suspension additionally comprises a secondary spring assembly 40 which can be connected selectively in parallel with the main spring assembly 16 so that the force of the secondary spring assembly 40 is added to that of the main spring assembly 16 and hence the spring rate of the suspension is increased (in other words the stiffness of the suspension is increased). The secondary spring assembly 40 is spaced longitudinally along the shaft 18 from the main spring assembly and comprises a secondary rubber or other elastic sleeve bonded at its inner surface to the shaft and at its outer surface to a secondary cylindrical housing 42. The secondary housing 42 carries a radial abutment 44 which can engage with a movable stop carried by the supporting frame.

The stop is formed by a projecting edge portion of a lever 46 mounted on the rear cross-member of the supporting frame 2, the lever 46 being pivotally movable between a first terminal position (shown in solid lines in FIG. 1 and designated "A" in which the stop is located out of the path of rotational movement of the abutment 44 and a second terminal position (shown in chain-dotted lines in FIG. 1 and designated "C") in which the stop is located in the path of the abutment. When the lever 46 is in its first terminal position, the secondary housing 42 will be free to rotate with the shaft 18 relative to the supporting frame 2 so that the secondary spring assembly will not exert any influence on the suspension. However, when the lever is in its second terminal position, rotation of the secondary housing 42 will be prevented by engagement of the stop on the lever 46 with the abutment 44 on the secondary housing 42. As a result the secondary spring assembly 40 will be resiliently stressed when the shaft 18 is rotated and will exert a resilient bias on the suspension in addition to that exerted by the main spring assembly 16.

The lever 46 is retained in either of its terminal positions by an over-center spring 48 which biases the lever 46 into the adjacent terminal position when the lever 46 has been moved manually through a central position. If the lever 46 is moved out of its first terminal position towards the second terminal position whilst the seat in statically loaded, the stop will make sliding contact with the side of the abutment 44 while the lever 46 is in an intermediate position (shown in chain-dotted lines in FIG. 1 and designated "B") so that the stop is prevented from moving into the path of the abutment 44. However, when the upward movement of the seat-supporting frame 2 displaces the abutment 44 sufficiently to clear the stop, the over-center spring 48 will cause the stop to snap into its terminal position.

Figure 4:
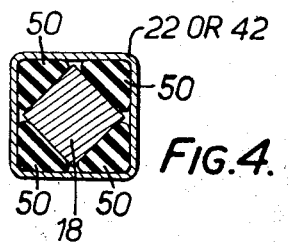
FIG. 4 is a section through a modified form of torsion spring assembly for the suspension of FIG. 1; and, FIG. 5 is a fragmentary plan of a modified form of the suspension.

The spring assembly shown in FIG. 4 differs from that of FIGS. 1 to 3 in that the shaft 18 and the housing 22 or 42 are of square cross-section, and are angularly offset, a rubber or other elastic insert 50 being interposed between each face of the shaft 18 and an adjacent corner portion of the housing 22 or 42. As will be apparent, when this spring assembly is loaded the inserts 50 will be compressively stressed. The inserts 50 are of circular cross-section when unstressed.

Figure 5:
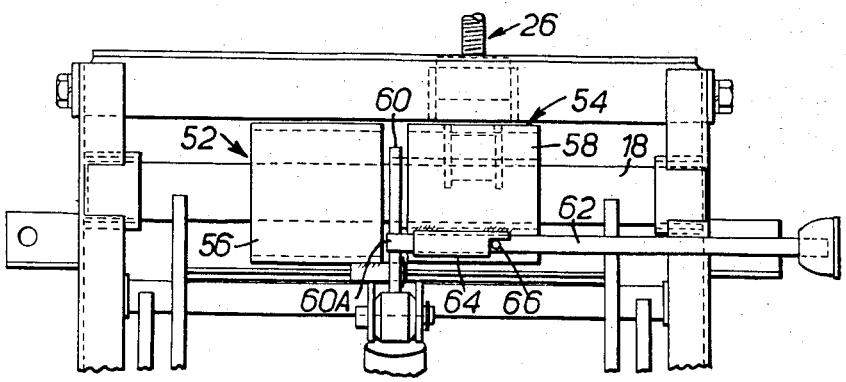

The suspension shown in FIG. 5 comprises first and second torsion spring assemblies 52, 54 mounted on the shaft 18 on either side of the logitudinal axis of the supporting frame 2. The first spring assembly comprises a rubber or other resilient sleeve bonded at its inner surface to the shaft 18 and at its outer surface to a cylindrical housing 56. The second spring assembly comprises an inner cylinder rotatable on the shaft 18 and a rubber or other resilient sleeve bonded at its inner surface to the outer surface of the inner cylinder and at its outer surface to the inner surface of a cylindrical housing 58. The cylindrical housing 58 is locked against rotation relative to the supporting frame 2 by a bias-varying device 26 as described in connection with the embodiment of FIGS. 1 to 3. An arm 60 interposed between the two spring assemblies 52, 54 and rotatable about the shaft 18 is rigidly secured to the housing 56 of the first spring assembly 52 and to the inner cylinder of the second spring assembly 54 and accordingly the inner cylinder rotates with the housing 56 of the first spring assembly 52. The arm 60 thus couples the first and second spring assemblies 52, 54 in series.

The second spring assembly 54 can be selectively rendered inoperative in order to increase the spring rate of the suspension. For this purpose, a locking rod 62 is slidable in a collar 64 carried by the housing of the second spring assembly, and is biased by a spring (not shown) into engagement with an aperture 60A in the arm 60; in this manner the inner cylinder and the housing of the second spring assembly 54 are locked against relative rotation. In order to disengage the rod 62 from the arm 60, and thus render the second spring assembly operative 54, the rod 60 is retracted against the bias of the spring and is rotated to engage a pin 66 on the rod 60 behind an abutment on the collar 64 so that the rod is held in its retracted position.

I claim:

1. A suspension system for a vehicle seat, said suspension system comprising a linkage including a pivotal arm mounted on a base part and arranged to support a seat for upwards and downwards movement relative to the base part, spring means operative to bias the arm upwardly relative to the base part, said spring means comprising a continually operative first spring assembly and a selectively operative second spring assembly, the second spring assembly comprising two concentric members, and an elastic body interposed between the members and deformable upon relative rotation between the members, and means for connecting each member to a separate one of two elements of the system which move relatively to one another during upward and downward movement of the seat, so that the said members are rotated relatively to one another by said relative movement of the elements, one of the connecting means being operative to permanently connect one member to its associated element and the other connecting means being selectively operative and comprising means for locking the other member and its associated element in a predetermined relative angular position, and selectively operable means for continuously biasing the locking means towards its locking position, said locking means being urged by the biasing means into its locking position only when the said other member and element are in their predetermined angular position.

2. A suspension system as claimed in claim 1, wherein one of said elements is the arm and is permanently connected to the said one member.

3. A suspension system as claimed in claim 2, wherein the first and second spring assemblies are arranged in parallel, and the first spring assembly comprises an elastic body interposed between a pair of concentric members, and deformed by relative rotation between the members, one of the concentric members being pivotal with the arm and the other member being held against pivotal movement with the said one member, and means for rotating the said other member relative to the said one member whereby to vary the preload exerted by the first spring assembly.

4. A suspension system as claimed in claim 3, wherein the said one concentric member of the first and second spring assemblies is formed by a respective part of a shaft pivotal with the arm.

5. A suspension system as claimed in claim 3, wherein the locking means comprises an abutment pivotal between a pair of limit positions in which the abutment respectively lies out of contact with, and in locking engagement with, the said other member of the second spring assembly, and the biasing means comprises an over-center spring assembly operative to bias the abutment from an over-center position into the adjacent one of said limit positions, the abutment being rigid with a lever for moving the abutment from a said limit position into the over-center position.

6. A suspension system as claimed in claim 1, wherein the linkage comprises a crossed-arm linkage.

7. A suspension system as claimed in claim 1, wherein the said one member comprises a shaft pivotal with the arms.

8. A suspension system as claimed in claim 1, wherein in each said spring assembly the elastic body comprises an elastic sleeve arranged concentrically between the two said concentric members and anchored thereto whereby the sleeve is stressed in shear upon relative rotation between the two concentric members.

9. A suspension system as claimed in claim 1, wherein in at least one of said spring assemblies the two concentric members have opposed surfaces which are polygonal in section and wherein a respective elastic body is located between a face of the inner concentric member and a corner portion of the outer concentric member whereby the bodies are compressively stressed upon relative rotation between the two concentric members.

* * * * *